United States Patent [19]

Barretto Garcia et al.

[11] Patent Number: 4,572,861

[45] Date of Patent: Feb. 25, 1986

[54] PREFABRICATED ELEMENT FOR USE IN PARTICULAR IN THE BUILDING INDUSTRY AND A METHOD OF MANUFACTURE OF SAID PREFABRICATED ELEMENT

[75] Inventors: Manuel Barretto Garcia; Aurora Zapata Oviedo, both of Caracas, Venezuela

[73] Assignee: Consultora Sides C.A., Caracas, Venezuela

[21] Appl. No.: 620,080

[22] Filed: Jun. 12, 1984

[30] Foreign Application Priority Data

Jun. 17, 1983 [FR] France ................................ 83 10029

[51] Int. Cl.[4] ................................................ B32B 5/02

[52] U.S. Cl. ...................................... 428/240; 52/443; 156/42; 428/246; 428/251; 428/283; 428/327; 428/340; 428/407; 428/703

[58] Field of Search ............... 428/283, 703, 251, 327, 428/407, 240, 246, 340; 156/42; 52/443; 106/85

[56] References Cited

U.S. PATENT DOCUMENTS

| | | | |
|---|---|---|---|
| 3,745,058 | 7/1973 | Paymal | 428/283 |
| 4,159,361 | 6/1979 | Schupack | 428/703 |

FOREIGN PATENT DOCUMENTS

| | | |
|---|---|---|
| 940899 | 12/1948 | France . |
| 1395480 | 3/1965 | France . |
| 324577 | 10/1957 | Switzerland . |
| 1348381 | 3/1974 | United Kingdom . |

*Primary Examiner*—James J. Bell
*Attorney, Agent, or Firm*—Young & Thompson

[57] ABSTRACT

The prefabricated element comprises a plurality of parallel layers which adhere to each other. A first layer (2) of low-density mortar contains a sheet (5) of woven mineral fibers extending parallel to and close to the internal surface. An intermediate layer (3) has exactly the same composition as the first layer but is filled with particles (7) of low-density heat-insulating material and also contains a sheet (6) of woven mineral fibers. A last layer (4) has exactly the same composition as the first layer but does not contain a sheet of woven mineral fibers.

9 Claims, 6 Drawing Figures

PREFABRICATED ELEMENT FOR USE IN PARTICULAR IN THE BUILDING INDUSTRY AND A METHOD OF MANUFACTURE OF SAID PREFABRICATED ELEMENT

The present invention relates to prefabricated elements which are produced for example in the form of parallelepipedal blocks or panels and are intended in particular for use in the building industry.

These prefabricated elements are primarily intended to constitute the non-structural portions or in other words the non-load-bearing portions of a building such as external wall coverings or internal wall linings, internal partition-walls, facade elements, ceilings, screens for providing protection against the sun and the like.

Many different types of prefabricated elements for the different uses mentioned in the foregoing are already known.

Thus the internal partition-walls of buildings are usually constructed of hollow bricks, of cellular parallelepipedal plaster blocks or of composite panels having a base of plaster and paperboard.

Internal wall linings of houses are usually of plaster or of prefabricated plaster-base panels which may be provided in some instances with an inner coating of heat-insulating material such as expanded polystyrene, glass fiber material or polyurethane foam.

All these elements having a plaster base, whether associated with a heat-insulating layer or not, are subject to many disadvantages. In the first place, they are delicate and must accordingly be handled with care. Secondly, they readily suffer degradation under the action of water, with the result that they have to be protected against bad weather conditions.

Furthermore, blocks of thick plaster are heavy to handle. When these plaster blocks are of the cellular type, they are admittedly of light weight but the formation of these cells entails the need for complicated molds which make these blocks relatively costly.

It is also known to make use of prefabricated blocks or panels of concrete reduced in weight by low-density materials or reinforced with mineral fibers.

However, the cost of these materials is relatively high. Furthermore, materials of this type are better suited to the construction of external facings of buildings rather than the construction of partition-walls, ceilings or internal wall-linings of houses.

It is thus observed that there is not a single instance in which the known prefabricated materials offer all the requisite properties which permit utilization over a very broad range of industrial applications, especially in the building industry.

The object of the present invention is to overcome the disadvantages of the designs mentioned in the foregoing by providing prefabricated elements which are easy and inexpensive to produce, which have a sufficient degree of mechanical strength while being of low weight, which have heat-insulating properties and are easy to handle. In addition, the thickness and shape of these elements can vary over a very wide range without affecting the properties mentioned above and as a function of their different potential uses, thus making them well-suited to an extensive field of applications.

In accordance with the invention, the prefabricated element which is primarily intended for buildings and is composed of a plurality of parallel layers bonded to each other essentially comprises:

a first layer of low-density mortar in which a sheet of woven mineral fibers extends in substantially parallel relation to the internal surface of said layer and in close proximity thereto;

at least one intermediate layer having a composition which is identical with that of the first layer but is additionally filled with particles of low-density heat-insulating material. In the same manner as the first layer, said intermediate layer comprises a sheet of woven mineral fibers extending in substantially parallel relation to and in proximity to the intermediate-layer surface which is remote from the first layer;

a last layer which is identical in composition with the first layer but does not contain a sheet of woven mineral fibers.

The prefabricated element in accordance with the invention is thus formed in one piece, the different layers being strongly bonded together since they are formed by means of a composition having an identical base.

The sheets of woven mineral fibers embedded in the end layers endow the entire element with excellent mechanical strength.

Moreover, in view of the fact that the intermediate layer contains particles of low-density heat-insulating material, said intermediate layer endows the entire element with an excellent heat-insulation capacity as well as low specific weight which facilitates transportation and handling of the element.

The intermediate layer can have a variable thickness which may in particular be greater than that of the end layers or can be replaced by a plurality of intermediate layers having identical compositions. Thus the total thickness of the element can be readily adapted to the desired insulating and/or mechanical properties.

Furthermore, by reason of the fact that the element in accordance with the invention has a base of low-density mortar, said element is strictly non-flammable, is also inexpensive to produce, has low weight, high strength and a high heat-insulation capacity. Thus it has properties which are not combined in any prefabricated element known in the building trade.

In an advantageous embodiment of the invention, the sheet of woven mineral fibers is a glass textile fabric and the particles of heat-insulating materials of the intermediate layer or layers are of expanded polystyrene or of expanded clay.

This glass textile fabric which is placed near the external surfaces of the element not only endows the entire structure with excellent mechanical properties in spite of the fact that the intermediate layers contain particles of material such as expanded polystyrene which have an adverse effect on the aforementioned mechanical properties but is also conducive to easy attachment of fixing means such as screws, nails and the like.

In a preferred embodiment of the invention, the different layers are formed by means of a mixture of gypsum, lime, cement, quartz dust, organic resin and water.

Gypsum is the basic material of the element. By virtue of the fact that this material sets rapidly in the presence of water, it permits very rapid fabrication of the elements in accordance with the invention.

Both lime and cement have the effect of increasing the hardness of the element.

Moreover, cement permits enhanced resistance of the element to weathering agencies and also achieves uniform hardness distribution both at the surface and within the mass of the element.

Quartz dust (or sand) also serves to increase the hardness of the material and in particular its resistance to mechanical impacts and to abrasion.

Organic resin serves to improve the formability of the material at the time of fabrication by molding and makes the element impervious to moisture.

Depending on the thickness of the intermediate layer or layers and their percentage content of lightweight particles such as expanded polystyrene, the specific weight of the element in accordance with the invention can vary between 450 and 1200 kilograms per cubic meter, which is a very low range of values in the case of building materials.

According to another aspect of the invention, the method for fabricating the elements in accordance with the invention comprises the following steps:

(A) the plaster and the other ingredients are mixed with water and the mixture thus obtained is poured into a mold having a horizontal bottom wall in order to form said first layer on said bottom wall, whereupon the sheet of woven mineral fibers is placed on the surface of said layer;

(B) a mixture which is identical with that of the first layer but contains an addition of low-density heat-insulating particles is poured over said first layer, whereupon a fresh sheet of woven mineral fibers is placed on the surface of said second layer;

(C) depending on the desired thickness of the prefabricated element, one or a number of additional layers having the same composition may be poured over said second layer while applying on each layer a fresh sheet of woven mineral fibers;

(D) a last layer which is identical in composition with the first is then poured without applying a sheet of woven mineral fibers on said last layer;

(E) after manual or mechanical surface finishing of the last layer, all the layers are allowed to dry and to harden, whereupon the element is removed from the mold.

This method is particularly simple to carry out in practice. Its chief advantage is the fact that the thicknesses of the different layers can be adjusted with precision and between very broad limits.

The extremely high speed of execution of this method is due primarily to the fact that gypsum which constitutes the basic material sets very rapidly, secondly to the fact that the basic composition of the different layers is identical and finally to the fact that no special equipment is required in order to place the sheets of woven mineral fibers in position.

Furthermore, the sheet of woven mineral fibers which is laid on the first layer forms a barrier which has the effect in particular of preventing the particles of low-density heat-insulating material from penetrating into said first layer at the time of pouring of the second layer since said particles would otherwise be liable to affect the desired properties of said first layer.

In addition, the practical application of this method is well-suited to continuous large-scale industrial manufacture of prefabricated elements for the building industry.

Other features of the invention will be more apparent to those skilled in the art upon consideration of the following description and accompanying drawings, wherein.

Figure 1:
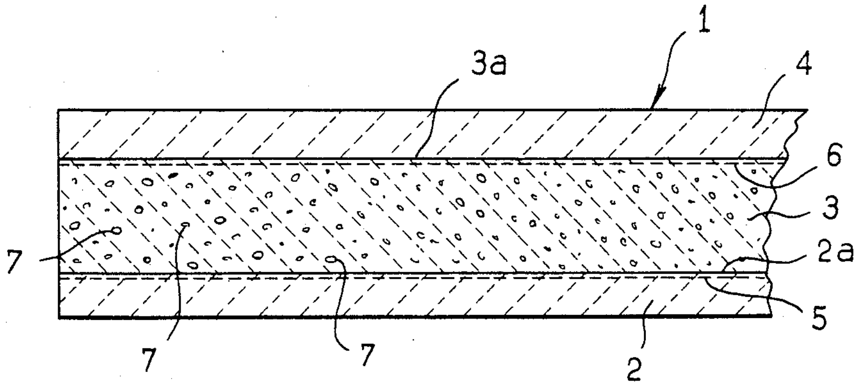
FIG. 1 is a cross-sectional view of a prefabricated element in accordance with the invention.

The plaster-base prefabricated element 1 shown in FIG. 1 has the shape of a parallelepipedal block and may be employed for example in order to form the internal lining or external facing of walls or internal partition-walls of buildings.

The element 1 comprises three superposed parallel layers 2, 3, 4 which adhere to each other.

Within the first layer 2, a sheet 5 of woven mineral fibers such as a glass textile fabric extends parallel to the internal surface 2*a* of said first layer and close to said surface (at a distance of a few millimeters).

This first layer 2 is covered by an intermediate layer 3 having a composition which is identical with this latter but which is additionally filled with particles 7 of low-density heat-insulating material such as beads of expanded polystyrene or expanded clay.

As in the case of the first layer 1, said intermediate layer 3 comprises a sheet 6 of mineral fibers which extends in a direction parallel to the surface 3*a* at a distance of a few millimeters from this latter.

Said intermediate layer 3 is covered by an outer layer 4 which is identical in composition with the first layer 2 but does not contain a sheet of woven mineral fibers.

The different layers 2, 3, 4 are obtained from a mixture of gypsum, lime, cement, quartz powder, organic resin and water, the function of the water being to ensure setting of the gypsum and of the cement.

The proportions of these compounds are preferably within the limits of the concentrations in weight per cent given below:

gypsum: 38 to 54%
lime: 4 to 15%
cement: 2.5 to 6%
quartz dust: 2 to 5%
organic resin: 0.7 to 3.5%
water: 28 to 40%

In the case of the intermediate layer 3, the proportion of particles 7 of low-density heat-insulating material such as expanded polystyrene preferably varies between 0.5 and 0.9% by weight.

By way of numerical examples, four different compositions which make it possible to obtain excellent results are given below:

| Constituents | A | B | C | D |
|---|---|---|---|---|
| gypsum | 53 | 49 | 45 | 39 |
| lime | 5 | 7 | 9 | 15 |
| cement | 5 | 4 | 3.85 | 3 |
| quartz | 4 | 3.78 | 3 | 2.8 |
| expanded polystyrene | 0.8 | 0.72 | 0.65 | 0.5 |
| resin | 3 | 2.50 | 1.50 | 0.7 |

-continued

| Constituents | A | B | C | D |
|---|---|---|---|---|
| water | 29.2 | 33 | 37 | 39 |

As shown in these examples, gypsum is the major constituent of the element in accordance with the invention. This compound sets rapidly in the presence of water and thus permits high-speed production of the element. Moreover, this compound permits very easy molding and demolding of the element, ensures excellent adhesion between the different layers 2, 3, 4 and has outstanding fireproofing properties.

When employed in the proportions specified above, the lime serves to increase the hardness of the element.

The cement improves the resistance of the element to atmospheric or weathering agencies while also resulting in increased hardness.

The quartz dust makes it possible to obtain uniform hardness throughout the thickness of the element and improves its resistance to mechanical impacts and to abrasion.

The organic resin improves the formability of the element while making this latter impervious to moisture. This resin can consist of a polysaccharide, collagen, a vinyl acetate copolymer with an acrylic ester or with a vinyl ester, or vinyl polyacetate homopolymers.

Said organic resin can receive an addition of strengthening and/or coloring fillers such as iron oxide, aluminum oxide or an alumina silicate.

In order to retard the very rapid setting of the gypsum in the presence of water, it is an advantage to add to the composition a set retarder such as acetic acid or methylhydroxyethyl cellulose at a concentration in weight per cent of the order of 0.5%.

The beads 7 of expanded polystyrene or the like make it possible to reduce the weight of the prefabricated element in accordance with the invention and to endow this element with an excellent heat-insulating capacity without affecting its mechanical strength. Depending on the composition, the specific weight of the element can accordingly vary between 450 and 1200 kilograms per cubic meter, the optimum value being of the order of 800 kilograms per cubic meter, which is a very low value in the case of a prefabricated element for building purposes.

The excellent mechanical strength of the element in accordance with the invention results from the fact that the intermediate layer 3 which has lower mechanical properties is sandwiched between the two outer layers 2 and 4 which have high hardness and strength since they are reinforced with sheets of glass textile fabric 5 and 6 and do not contain expanded polystyrene beads.

The total thickness of the element shown in FIG. 1 can vary between 15 mm and several tens of centimeters.

In the case of minimum thicknesses, the prefabricated element in accordance with the invention can advantageously replace the plasterboard panels conventionally employed for covering walls and ceilings.

In the case of greater thicknesses, the element can be employed as a substitute for the hollow bricks or cellular plaster blocks which are employed for the construction of interior partition-walls of buildings.

Figure 2:
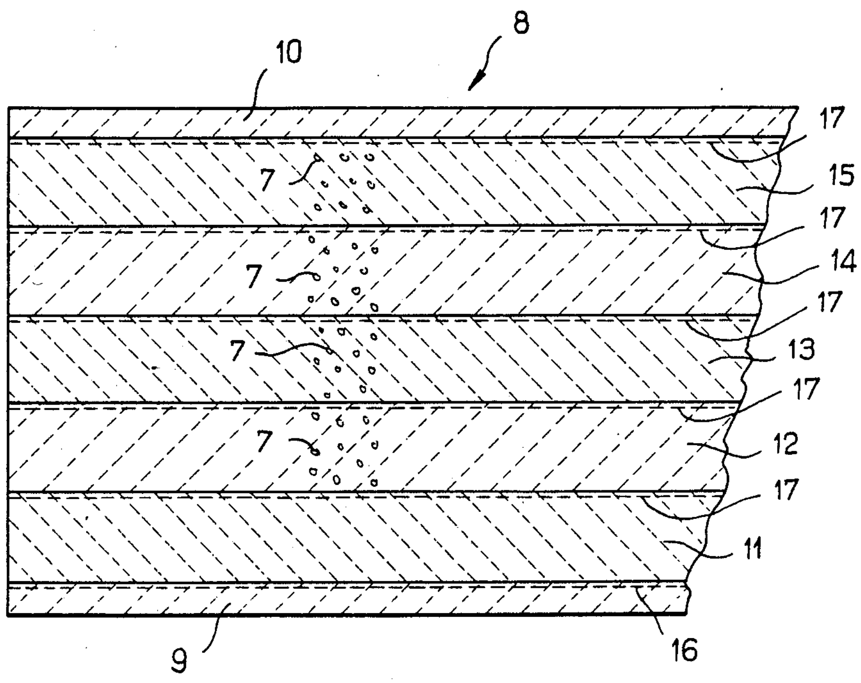
FIG. 2 is a cross-sectional view of another embodiment of a prefabricated element in accordance with the invention.
Figure 3:
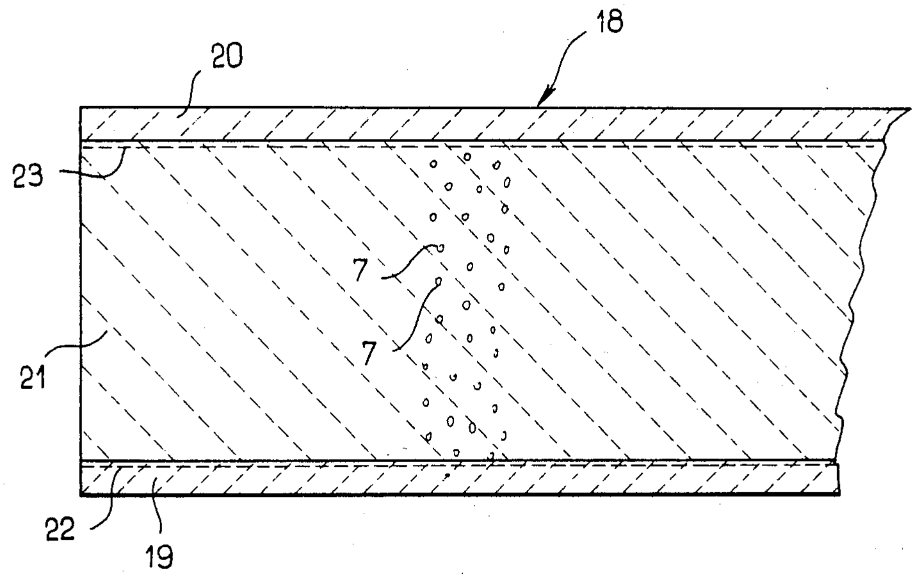
FIG. 3 is a view which is similar to FIGS. 1 and 2 and relates to a third embodiment of a prefabricated element.

In the embodiment of FIGS. 2 and 3, there are shown elements having a thickness which may attain 400 mm.

In the case of FIG. 2, the element 8 comprises two outer layers 9, 10 which do not contain expanded polystyrene beads and are separated by a plurality of intermediate layers 11, 12, 13, 14, 15 filled with expanded polystyrene beads 7.

Near the surface of the first layer 9 which is in contact with the following layer 11, said first layer contains a sheet 16 of glass textile fabric. Similarly, each intermediate layer 11, 12, 13, 14, 15 contains a sheet 17 of glass textile fabric located near that surface of said layer which is in contact with the next layer.

In this example, the thickness of the outer layers 9, 10 is of the order of 20 mm whilst the thickness of the intermediate layers 11 to 15 is of the order of 80 to 100 mm.

It is in fact preferable to form outer layers 9, 10 of relatively small thickness in comparison with the thickness of each internal layer 11 to 15 in order to reduce the total weight of the element to a minimum value.

Moreover, it is an advantage to place the glass textile sheets 16, 17 in relatively close proximity to the external surface of the element since experience has shown that these sheets 16, 17 facilitate attachment of fastening means such as nails, screws and the like.

In the case of the embodiment shown in FIG. 3, the prefabricated element 18 comprises two relatively thin outer layers 19, 20 separated by a single intermediate layer 21 of substantial thickness and containing expanded polystyrene beads 7.

This element contains only two glass textile sheets 22, 23 extending respectively within the outer layer 19 close to that surface of said layer which is in contact with the intermediate layer 21 and close to the contact surface between this latter and the outer layer 20.

The prefabricated element 18 thus has lower mechanical strength than the element 8 shown in FIG. 2 but is less costly to produce than said element 8.

Figure 4:
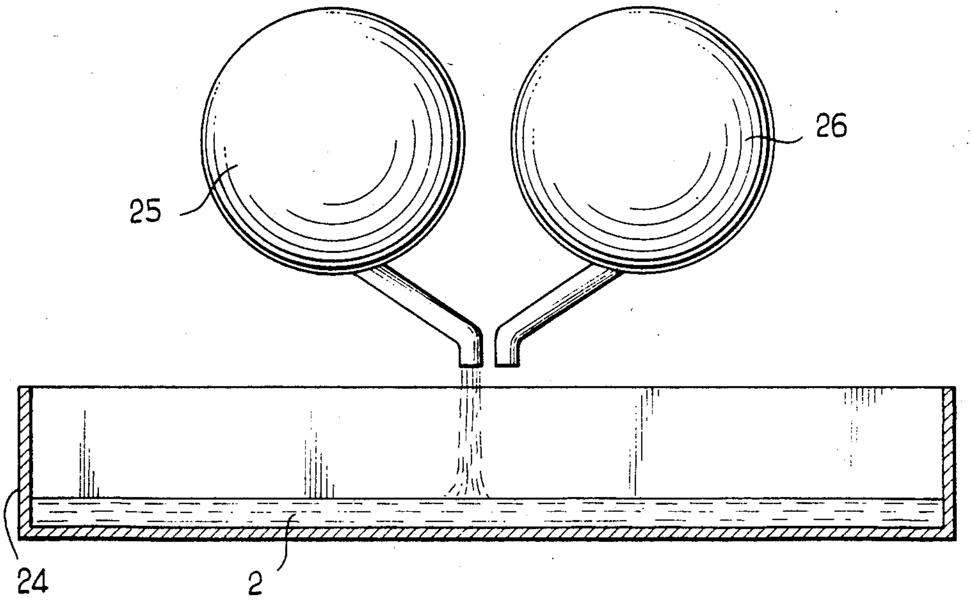
FIG. 4 is a view showing in particular a cross-section of the mold employed for carrying out the method in accordance with the invention and illustrating the first step of this method.
Figure 5:
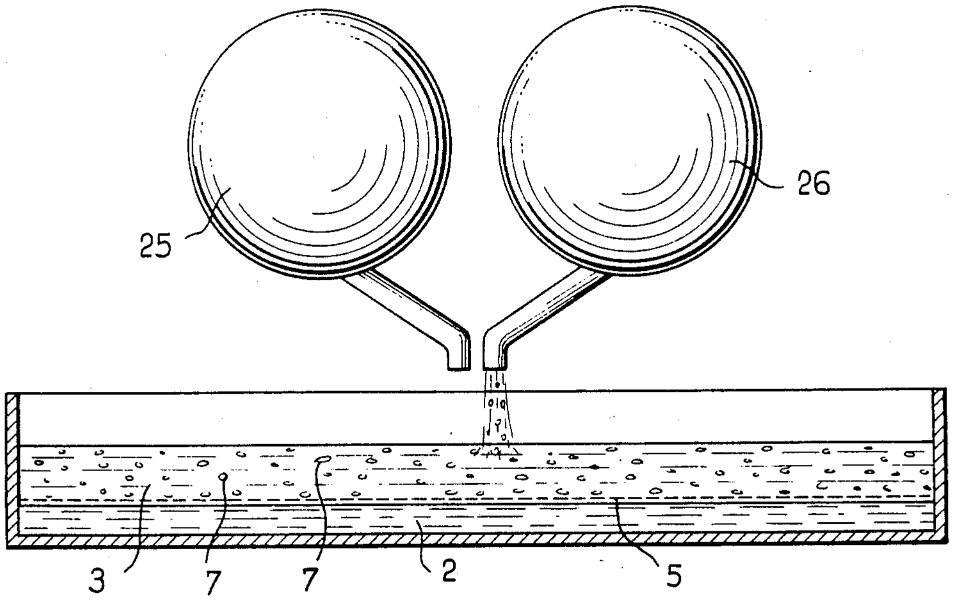
FIG. 5 is a view which is similar to FIG. 4 and illustrates a subsequent step of the method.
Figure 6:
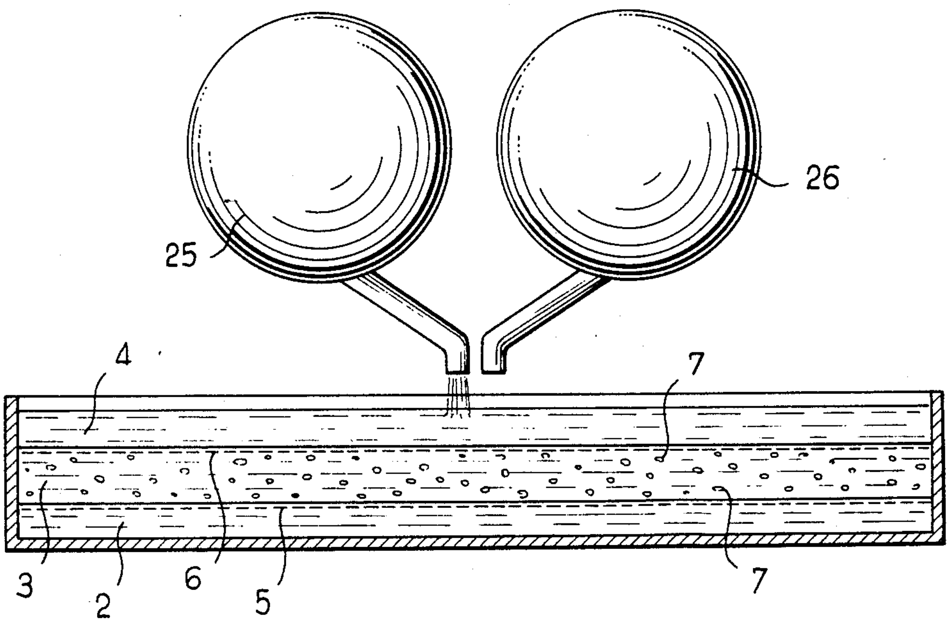
FIG. 6 is a view which is similar to FIGS. 4 and 5 and illustrates the last pouring step of the method.

Referring now to FIGS. 4 to 6, consideration will be given in the following description to the manufacture of a prefabricated element corresponding for example to the element shown in FIG. 1.

The practical application of the method calls for the use of a mold 24 having a horizontal bottom wall in the shape of a parallelepipedal tray.

Two storage tanks 25, 26 are placed side by side above the mold 24. These tanks contain mechanical stirring means and a mixture of gypsum, lime, cement, quartz dust, organic resin, set retarding agent and water in accordance with the examples of composition given earlier.

In addition to the compounds mentioned in the foregoing, the storage tank 26 contains beads of expanded polystyrene.

In a first step, the aforesaid mixture formed within the storage tank 25 is poured (as illustrated in FIG. 4) substantially at the center of the mold 24 in order to form at the bottom of said mold the first layer 2 of the element shown in FIG. 1.

During this step, the mold is subjected to horizontal vibrations in order to ensure that the mixture is spread uniformly over the bottom wall of the mold 24.

As shown in FIG. 5, a sheet 5 of glass textile fabric is then laid on said layer 2. Under the action of the vibrations exerted on the mold, this textile sheet 5 sinks within the layer 2 to a slight extent and is completely embedded in this layer.

In a second step, the mixture containing an addition of expanded polystyrene 7 formed within the storage tank 26 is poured over the first layer 2 in order to form the intermediate layer 3. During this operation, the sheet 5 of glass textile fabric prevents the expanded polystyrene beads 7 from penetrating into the first layer 2.

A fresh sheet 6 of glass textile fabric is then laid on the surface of the intermediate layer 3 (as shown in FIG. 6). As in the case of the sheet 5, said sheet 6 sinks to a slight extent within said layer 3.

As shown in FIG. 6, a last layer 4 having a composition which is identical with that of the first layer 2 is then poured from the storage tank 25 onto the intermediate layer 3.

In view of the fact that the expanded polystyrene beads are trapped between the two sheets 5 and 6 of glass fabric, any upward displacement of said beads into the outer layer 4 is prevented by the action of eddy currents of liquid which are formed at the time of pouring of said layer.

Conventional finishing of the external surface of the layer 4 is then carried out either by mechanical means or by hand.

The mold 24 containing the three layers 2, 3, 4 is then moved horizontally toward an air-drying tunnel in order to carry out an initial drying operation.

After complete drying of the mixture which has been poured into the mold 24, the element in accordance with the invention is removed from the mold by conventional pneumatic or mechanical takeout means.

The prefabricated element is then stored for subsequent use.

In order to produce an element of the type shown in FIG. 2, it is only necessary to repeat the second pouring step several times by applying a fresh sheet of glass textile fabric on each intermediate layer.

The practical application of the method or in other words the procedure which involves pouring of the mixtures, positioning of the glass fabric sheets and transfer of the mold to the drying tunnel can be fully automatic, with the result that this method is particularly well-suited to large-scale industrial production of prefabricated elements.

The method in accordance with the invention is extremely fast since it is carried out continuously without waiting for the first layers to dry before pouring the following layers.

Furthermore, this method makes it possible to form elements having a wide range of different thicknesses, specific weights, insulating properties and mechanical strength characteristics by adjusting the thicknesses of the different layers, the proportion of low-density heat-insulating particles, the number of glass fabric sheets, and so on.

Thus the prefabricated elements obtained in accordance with the invention can be adapted to a large number of different industrial applications.

By virtue of their light weight, these elements can be handled with great ease. Furthermore, their impact strength is such that transportation and handling of such elements do not call for any particular precautions.

A further point worthy of note is that these elements are non-flammable, resistant to moisture and to the action of the sun.

Another advantageous feature of said elements is that they have excellent heat-insulating properties.

In addition, these prefabricated elements have an excellent state of surface which accurately reproduces the internal surface of the mold and is consequently conducive to the achievement of remarkable architectural effects.

Furthermore, these elements can be colored throughout, coated with paint or covered with tiles fixed on said elements by means of a tack coat having a base of cement and conventional adhesive material.

It will be readily apparent that the invention is not limited to the examples described in the foregoing and that any number of modifications may accordingly be contemplated without thereby departing either from the scope or the spirit of the invention.

From this it follows that the shape of the prefabricated elements in accordance with the invention is not limited to the shape of parallelepipedal blocks or panels.

In point of fact, the invention is equally applicable to U-section elements which may be in the form of arches or the like and are primarily intended for decoration of facades.

These elements can also be shaped so as to form bowls or boxes to be subsequently filled with soil for plants such as ornamental shrubs or flowers.

What is claimed is:

1. A prefabricated element (1, 8, 18) which is primarily intended for the building industry and is composed of a plurality of parallel layers bonded to each other, wherein said element comprises:

a first layer (2, 9, 19) of low-density mortar in which a sheet (5, 16, 22) of woven mineral fibers extends in substantially parallel relation to and in proximity to the internal surface of said layer;

at least one intermediate layer (3, 11, 21) having a composition which is identical with that of the first layer but is additionally filled with particles (7) of low-density heat-insulating material, said intermediate layer being provided in the same manner as the first layer (2, 9, 19) with a sheet (6, 17, 23) of woven mineral fibers extending in substantially parallel relation to and in proximity to the intermediate-layer surface which is remote from said first layer;

a last layer (4, 10, 20) which is identical in composition with the first layer but does not contain a sheet of woven mineral fibers, the first layer (2, 9, 19) and the last layer (4, 10, 20) having the following composition by weight:

gypsum: 38 to 54%
lime: 4 to 15%
cement: 2.5 to 6%
quarta dust: 2 to 5%
organic resin: 0.7 to 3.5%
water: 28 to 40%.

2. An element according to claim 1, wherein the sheet (5, 6, 16, 17, 22, 23) of woven mineral fibers is a glass textile fabric.

3. An element according to claim 1, wherein the particles (7) of heat-insulating material of the intermediate layer are of expanded polystyrene.

4. An element according to claim 1, wherein said element comprises a plurality of superposed intermediate layers (11, 12, 13, 14, 15) having identical compositions and separated by sheets (17) of woven mineral fibers.

5. An element according to claim 1, wherein the different layers are formed by means of a mixture of gypsum, lime, cement, quartz dust, organic resin and water.

6. An element accordinig to claim 1, wherein the intermediate layer or layers (3, 11 to 15, 21) contain between 0.5 and 0.9% by weight of expanded polystyrene particles (7).

7. An element according to claim 5, wherein the layers further contain up to 0.5% by weight of an agent for retarding the setting time of gypsum, this retardant being selected from acetic acid and methylhydroxyethyl cellulose.

8. An element according to claim 1, wherein the specific weight of said element is within the range of 450 to 1200 kilograms per cubic meter.

9. A method of manufacture of a prefabricated element which is primarily intended for use in the building industry, comprising bonding together the following layers:

a first layer (2, 9, 19) of low-density mortar in which a sheet (5, 16, 22) of woven mineral fibers extends in substantially parallel relation to and in proximity to the internal surface of said layer;

at least one intermediate layer (3, 11, 21) having a composition which is identical with that of the first layer but is additionally filled with particles (7) of low-density heat-insulating material, said intermediate layer being provided in the same manner as the first layer (2, 9, 19) with a sheet (6, 17, 23) of woven mineral fibers extending in substantially parallel relation to and in proximity to the intermediate-layer surface which is remote from said first layer;

a last layer (4, 10, 20) which is identical in composition with the first layer but does not contain a sheet of woven mineral fibers, the first layer (2, 9, 19) and the last layer (4, 10, 20) having the following composition by weight:

gypsum: 38 to 54%
lime: 4 to 15%
cement: 2.5 to 6%
quartz dust: 2 to 5%
organic resin: 0.7 to 3.5%
water: 28 to 40%.

* * * * *